United States Patent [19]

Becker et al.

[11] 4,299,396
[45] Nov. 10, 1981

[54] QUICK RELEASE SEAL RETAINER

[75] Inventors: Danny J. Becker, Peoria; Ronald L. Satzler, Princeville; Keith E. Koch, Tremont, all of Ill.

[73] Assignee: Caterpillar Tractor Co., Peoria, Ill.

[21] Appl. No.: 197,831

[22] PCT Filed: Mar. 12, 1980

[86] PCT No.: PCT/US80/00271
§ 371 Date: Mar. 12, 1980
§ 102(e) Date: Mar. 12, 1980

[51] Int. Cl.³ .......................... F16J 15/10; B29H 5/02
[52] U.S. Cl. ..................................... 277/12; 277/101; 277/187; 220/315; 220/378; 425/28 B; 425/47
[58] Field of Search ....................... 277/4, 12, 66, 101, 277/104, 107, 113, 126, 130–132, 187, 189; 425/DIG. 44, 28 B, 35, 47; 220/315, 378

[56] References Cited

U.S. PATENT DOCUMENTS

| | | | |
|---|---|---|---|
| 1,223,156 | 4/1917 | Du Bois | 220/315 |
| 1,875,816 | 9/1932 | Krause | 425/47 X |
| 2,024,811 | 12/1935 | Van Camp | 425/28 B |
| 2,253,792 | 8/1941 | Levenworth | 425/28 B |
| 2,700,928 | 2/1955 | Strike | 277/12 X |
| 2,714,225 | 8/1955 | Stacy et al. | 425/47 |
| 3,860,142 | 1/1975 | Jurges | 277/187 X |
| 4,124,361 | 11/1978 | Revell | 277/101 X |
| 4,207,052 | 6/1980 | Satzler | 425/28 B X |

*Primary Examiner*—Robert S. Ward, Jr.
*Attorney, Agent, or Firm*—John W. Grant

[57] ABSTRACT

A quick release seal retainer (10,11) adapted for connecting a seal segment (13) to a base (12) has a clamp member (31) positioned within a slot (29) formed between a projection (28) of a mounting block (26) and the base (12). A pair of studs (38) slidably extending through a pair of bores (37) in the projection (28) have one end connected to the clamp member (31) and the other end connected to a bar (39). In one embodiment a cam clamp mechanism (51) is connected to the mounting block (26) for locking the bar (39) and hence the clamp member (31) at a position at which the seal segment (13) is clamped against the base (12). In another embodiment an over-center toggle link means locks the bar (39) and hence the clamp member (31) at a position at which the seal segment (13) is clamped against the base (12). Both the cam clamp mechanism (51) and the toggle link means can be easily actuated to one position to release an old seal segment and to another position to lock the new seal segment in place even when the base (12) is at an elevated operating temperature.

9 Claims, 6 Drawing Figures

U.S. Patent  Nov. 10, 1981  Sheet 3 of 3  4,299,396
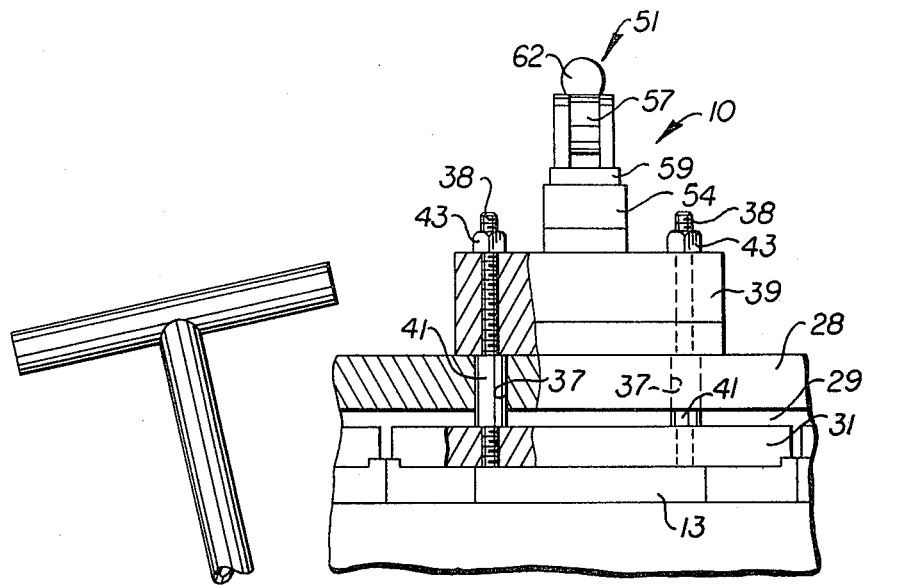
FIG. 3.
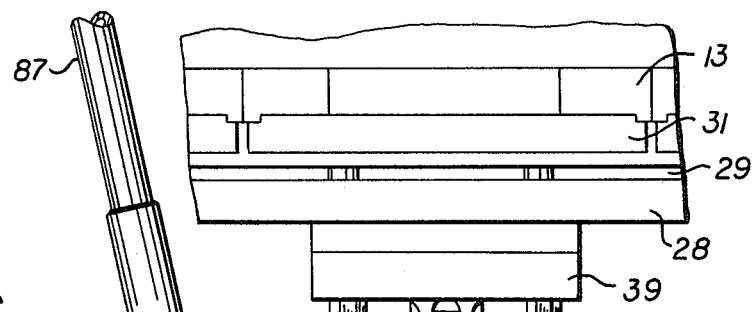
FIG. 6.
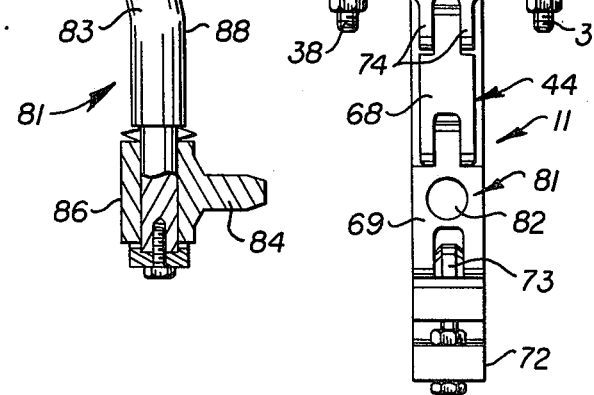

positioned within the slot and has a stepped surface 32 mating with a mating surface of the seal segment 13.

A means 36 is provided for slidably connecting the clamp member 31 to the projection 28 for rectilinear movement of the clamp member 31 between a first position at which the seal segment 13 is clamped between the clamp member 31 and the base 12 and a second position at which the seal segment 13 is released. As shown in FIG. 3 the means 36 can be, for example, a pair of bores 37 extending through the projection 28, a pair of studs 38 and a bar 39. Each of the studs 38 has an enlarged portion 41 slidably positioned within the respective bores 37. One end of each stud is threadably connected to the clamp member 31 while the opposite end portion is connected to the bar 39 by a nut 43.

A means 44 is provided for quickly locking the connecting means 36 and hence the clamp member 31 at the first position and for moving the clamp member 31 between the first and second positions. As shown in FIG. 5 the locking and moving means 44 includes means 46 for resiliently urging the clamp member 31 from the first position to the second position. The resilient urging means 46 can include, for example, a pair of spring plungers 47 each threadably seated in a threaded bore 48 in the bar 39 and reacting against the projection 28 of the mounting block 26.

The locking and moving means 44 of the first quick release seal retainer 10 also includes a cam clamp mechanism 51 connected to a plate 52 connected to the mounting block 26 by a plurality of bolts 53. The cam clamp mechanism 51 includes a member 54 having one end in engagement with the bar 39 and the other end seated on a post 56 extending upwardly from the plate 52. An eye bolt 57 extends through a slot 58, FIG. 1, in the member 54, a pair of washers 59,60 positioned on opposite sides of the member 54, a spring 61 and is threadably connected to the plate 52. A cam actuator 62 is pivotally connected at a pivot 63 to the eye bolt 57 and has a cam surface 64 in engagement with the washer 59. The post 56 acts as a fulcrum for the member 54 with the cam actuator 62 being of a construction sufficient for urging the end of the member 54 in engagement with the bar 39 toward the projection 28 in response to clockwise rotation of the cam actuator 62 as viewed in FIG. 2.

The locking and moving means 44 of the second quick release seal retainer 11 includes a bracket 66, first and second toggle links 67,68, and a stop means 69. The bracket is connected to the lower mounting block 26 by a plurality of bolts 71. The first toggle link 67 has one end pivotally connected to an eye bolt 73 adjustably connected to a lower end 72 of the bracket 66. The second toggle link has one end pivotally connected to a clevis 74 connected to the bar 39. The other end of the second toggle link 68 is pivotally connected at pivot 76 to the other end of the first toggle link 67. The stop means 69 can be a bolt 77 threadably connected to the bracket 66 and extending through a spacer 78. The first and second toggle links 67,68 are movable between a first position (the pivot 76 positioned left of the position shown in FIG. 2) at which both of the links are free from engagement with the stop means 69 and the seal segment 13 is released from the base 12 and a second position at which the end of the first toggle link 67 is in engagement with the stop means 69 and the seal segment 13 is clamped between the clamp member 31 and the base 12. The first and second toggle links 67,68 pass through a straight line condition in response to being moved between the first and second positions. Thus, an over-center type toggle action is provided such that with the first toggle link 67 being in engagement with the bolt 71, the bar 39 and thus the clamp member 31 are mechanically locked at the second position of the clamp member 31.

Referring now to FIGS. 3 and 6, a means 81 is provided for pivoting the first and second toggle links 67,68 between the first and second positions. The pivoting means 81 can be for example a hole 82, FIG. 3, in the first toggle link 67 and a tool 83, FIG. 6, having a tang 84 adapted to slidably fit within the hole 82. The tang 84 extends outwardly from a head 86 which has a handle 87 rotatably connected to the head 86. Preferably the handle 87 has a bend 88 formed therein for a later defined purpose.

Referring to FIG. 4, the seal segment 13 is a part of a seal assembly 91 adapted for sealing against the end of the track belt 19 and for sealingly embracing the end portion 22 of the anchor plates 21 extending from the axial end of the track belt 19.

The seal assembly has an inner annular seal 92 having a plurality of alternate cutouts 93 and projections 94 formed at the outer periphery 95. The cutouts 93 are preferably of a size sufficient for intimately receiving the end portion 22 with the projections 94 extending radially between the end portions 22 and terminate at the median of the end portions. The inner annular seal 92 is preferably made up of a plurality of inner seal segments 96 positioned in end-to-end relationship. As shown in FIG. 2, the inner seal segments 96 are clamped to the respective upper and lower seal ring 17,18 by a retainer element 100.

An outer seal 97 is made up of a plurality of the outer seal segments 13 positioned in end-to-end relationship. Each of the outer seal segments 13 has a cutout 98 positioned between opposite end portions 99. The cutouts 98 are preferably of a size sufficient for intimately receiving the outer portion of the end portion 22. The end portions 99 are in sealing engagement with the projections 94 of the inner seal 92.

INDUSTRIAL APPLICABILITY

In use the upper seal segment 13 can be released simply by pivoting the cam actuator 62 about pivot 63 to relieve the camming action on the member 54. This releases the bar 39 allowing the spring plungers 47 to resiliently move the bar 39 and hence the clamp member 31 from the first position to the second position. The old seal segment 13 is then easily removed and a new seal segment 13 installed. The cam actuator 62 is then pivoted in the opposite direction causing the member 54 to move the bar 39 and hence the clamp member 31 to the first position locking the seal segment 13 in place.

The lower seal segment 13 can be quickly replaced by actuation of the second quick release seal retainer 11. Specifically, the tang 84 of the tool 83 is inserted into the hole 82 in the first toggle link 67. The tool 83 is then pivoted to move the first and second toggle links 67,68 from the second position to the first position. Due to the limited space between the inner mold segment 16 and the outer mold segment or base 12 the handle 87 of the tool 83 is rotated relative to the head 86 to utilize the effect of the bend 88 in the handle 87 to obtain additional pivotal movement of the outer end of the handle 87 in order to obtain sufficient movement of the first and second toggle links 67,68 to release the seal segment 13. After the old seal segment 13 has been replaced with

QUICK RELEASE SEAL RETAINER

TECHNICAL FIELD

This invention relates to seal retainers and more particularly to a quick release seal retainer which permits rapid replacement of worn or damaged seal segments.

BACKGROUND ART

The basic track belt disclosed in U.S. Pat. No. 3,899,220 issued to Grawey et al on Aug. 12, 1975 is cured in a curing mold disclosed in Great Britain Pat. No. 1,555,880 published Nov. 14, 1979. Basically the curing mold includes a plurality of inner mold segments which move radially outwardly to form the inside surface of the track belt and a plurality of outer mold segments which move radially inwardly to form the outside surface of the track belt. The uncured rubber making up the track belt is compressed between the inner and outer segments which are heated to about 200° to 220° centigrade for curing the rubber and causing the rubber to bond to the integral anchor plates and reinforcing cable within the track belt. Inner segmented seals are carried by upper and lower rings and cooperate with outer seal elements carried by the outer mold segments for preventing the rubber in the track belt from extruding from between the inner and outer segments. Each of the inner seal segments has a projection for sealingly engaging a mating surface of the respective outer mold segment. A depression is formed between adjacent projections and cooperates with a depression in the respective outer seal element for sealingly embracing a portion of the anchor plate extending axially outwardly from the track belt. Each of the outer seal elements has a pair of relatively narrow protrusions on the opposite side of the depression for sealing against the side of the projections of the inner seal segments. The inner seal segments and outer seal elements are secured to the respective upper and lower rings and outer mold segments by plates bolted thereto.

One of the problems encountered with the belt curing mold is that replacement of the outer seal elements cause considerable down time of the curing mold and a waste of energy since it is necessary to let the curing mold cool down from the operating temperature before a mechanic can work on the mold. Of course, once the curing mold has cooled down and the seal element replaced, it is necessary to bring the curing mold back up to operating temperature before the next track belt can be cured. The replacement problem is compounded because the life of the outer seal elements has not been satisfactory thereby causing more frequent replacement. The short life of the outer seal element is attributed to the design of the seal arrangement and particularly the relatively narrow protrusions which tend to be deformed or break easily if the seal element is even slightly misaligned from the anchor plate.

The present invention is directed to overcoming one or more of the problems as set forth above.

DISCLOSURE OF THE INVENTION

In one aspect of the present invention a quick release seal retainer adapted for connecting a seal segment to a base has a mounting block connected to the base. The mounting block has a projection extending outwardly above the base defining a slot between the base and the projection. A clamp member is positioned within the slot. A means is provided for slidably connecting the clamp member to the projection of the mounting block for rectilinear movement of the clamp member between a first position at which the seal segment is clamped between the clamp member and the base and a second position at which the seal element is released. A means is provided for quickly locking the connecting means and hence the clamp member in the first position and for moving the clamp member between the first and second positions.

The problem of replacing worn or damaged outer seal segments in a curing mold is overcome by use of the quick release seal retainer. Actuation of the quick release seal retainer releases the old seal segment so that it can be removed and replaced with a new seal segment. The quick release seal retainer is again actuated to lock the new seal segment in place. The quick release seal retainer can be actuated and the seal segment replaced while the curing mold is at its operating temperature by a mechanic wearing insulated gloves.

BRIEF DESCRIPTION OF THE DRAWINGS

FIG. 3 is an elevational view as viewed along line III—III of FIG. 2.

FIG. 6 is a elevational view of a tool for actuation of a lower quick release seal retainer.

BEST MODE FOR CARRYING OUT THE INVENTION

Figure 1:
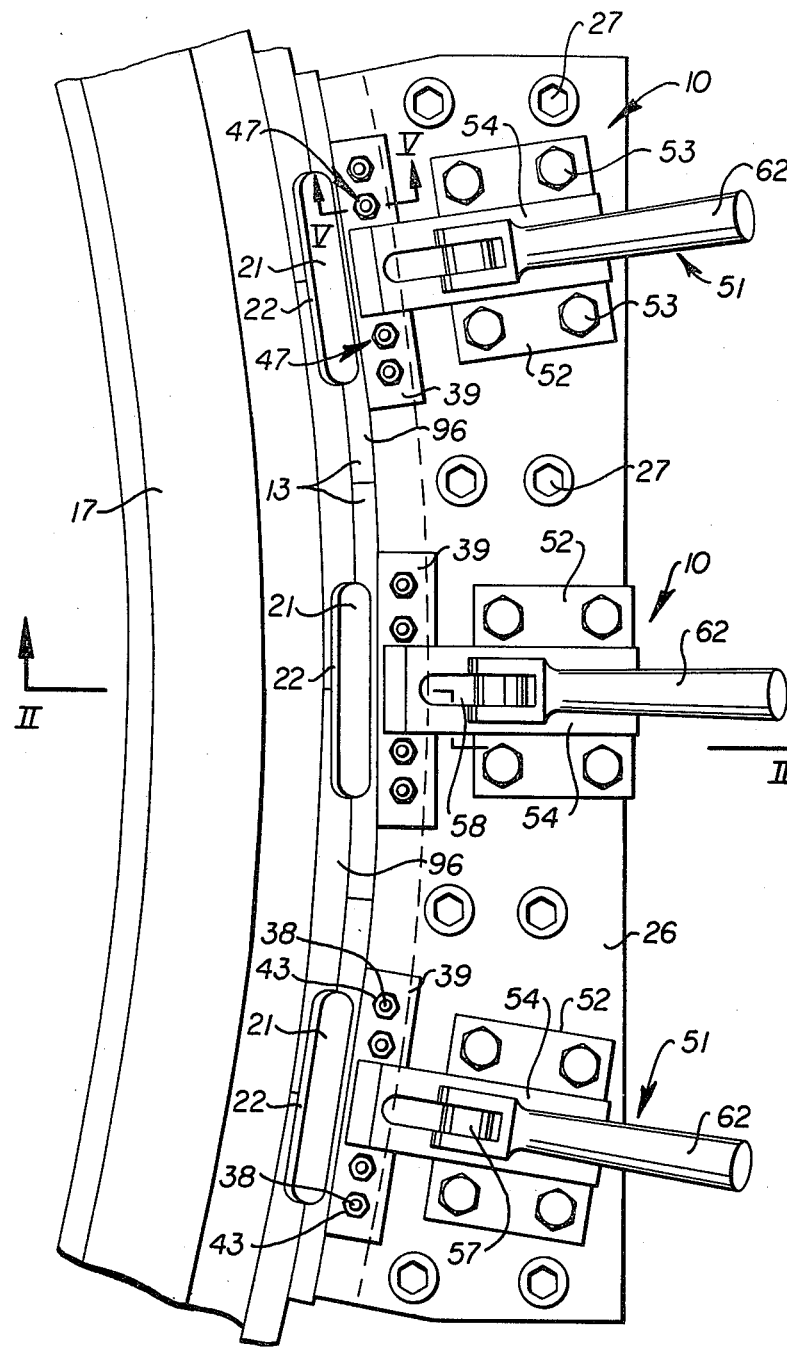
FIG. 1 is a diagrammatic partial plan view of an embodiment of the present invention.
Figure 4:
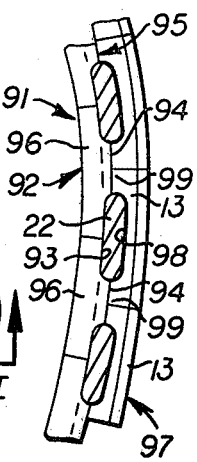
FIG. 4 is a partial plan view of the seal arrangement.
Figure 2:
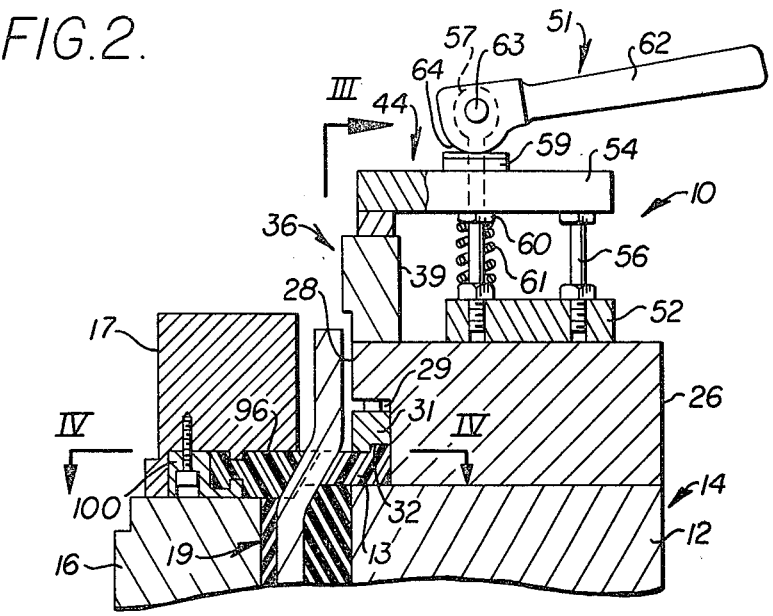
FIG. 2 is a sectional view taken along line II—II of FIG. 1.
Figure 2:
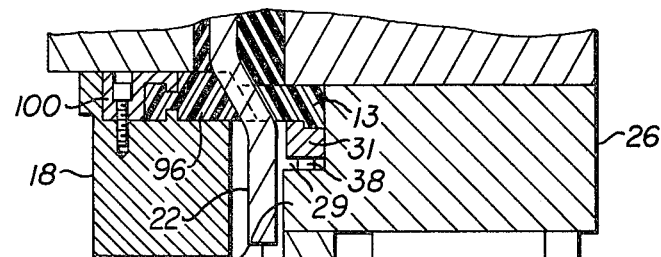
Figure 5:
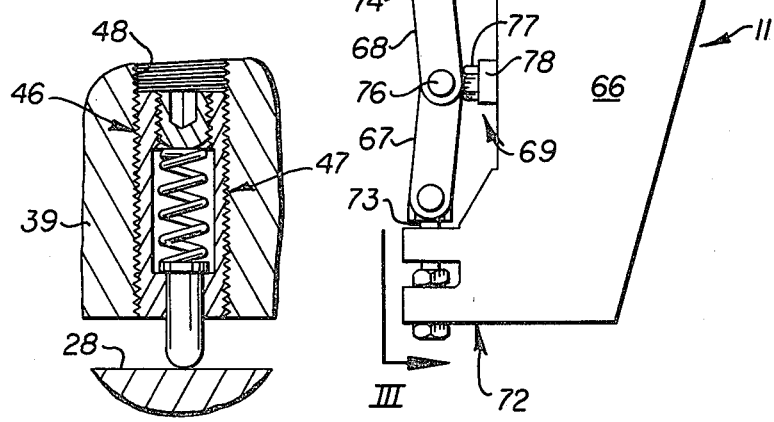
FIG. 5 is a sectional view taken along line V—V of FIG. 1.

Referring now to FIGS. 1 and 2 of the drawings first and second quick release seal retainers 10,11 are shown mounted to opposite ends of a base 12 for clamping a seal segment 13 to the base. The base 12 can be, for example, an outer mold segment of a track belt curing mold generally indicated by the reference numeral 14 and which also includes an inner mold segment 16, an upper seal ring 17 and a lower seal ring 18. Since the curing mold 14 per se forms no part of the present invention it will suffice to state that the inner mold segment 16 can move leftwardly as viewed in FIG. 2 from the position shown and is only one of a plurality of inner mold segments which form the inner cylindrical surface of a workpiece, for example a track belt 19. The outer mold segment or base 12 can move rightwardly from the position shown in FIG. 2 and likewise is only one of a plurality of outer mold segments which form the outer surface of the track belt 19. The upper seal ring 17 can move upwardly from the position shown and away from the inner mold segment 16. A complete disclosure of the track belt curing mold 14 can be found in Great Britain Pat. No. 1,555,880.

The track belt 19 includes as an integral part thereof a plurality of anchor plates 21 having end portions 22 extending axially outwardly from the axial edge of the track belt 19.

Each of the quick release seal retainers 10,11 has a mounting block 26 connected to the end of the base 12 by a plurality of bolts 27. A projection 28 extends outwardly above the base 12 defining a slot 29 between the base 12 and the projection 28. A clamp member 31 is a new seal segment 13 the above operation is reversed to lock the new seal segment in place.

From the foregoing it is readily apparent that both the first and second quick release seal retainers 10,11 provide for the rapid replacement of the respective upper or lower seal segment 13. Both of the quick release seal retainers can be actuated by the mechanic even though he may be wearing heavy insulated gloves so that the seal segments can be replaced when the mold is at its relatively high operating temperature.

Other aspects, objects and advantages of this invention can be obtained from a study of the drawings, the disclosure and the appended claims.

What is claimed is:

1. A quick release seal retainer (10,11) adapted for connecting a seal segment (13) to a base (12), comprising:
    a mounting block (26) connected to the base (12) and having a projection (28) extending outwardly above the base (12) defining a slot (29) between the base (12) and projection (28);
    a clamp member (31) positioned within the slot (29);
    means (36) for slidably connecting the clamp member (31) to the projection (28) of the mounting block (26) for rectilinear movement of the clamp member (31) between a first position at which the seal segment (13) is clamped between the clamp member (31) and the base (12) and a second position at which the seal segment (13) is released;
    means (44) for quickly locking the connecting means (36) and hence the clamp member (31) at the first position and for moving the clamp member (31) between the first and second positions; and
    wherein said connecting means (36) includes a bore (37) extending through the projection (28), a stud (38) slidably positioned within the bore (37) and having one end connected to the clamp member (31), and a bar (39) connected to the other end of the stud (38).

2. The quick release seal retainer (10,11) of claim 1 wherein said locking and moving means (44) includes means (46) for resiliently urging the clamp member (31) from the first position to the second position.

3. The quick release seal retainer of claim 2 wherein said resilient urging means (46) includes a spring mechanism (47) connected to the bar (39) and reacting against the projection (28) of the mounting block (26).

4. The quick release seal retainer (11) of claim 1 wherein said locking and moving means (44) includes a bracket (66) connected to the mounting block (26), a first toggle link (67) having one end pivotally connected to the bracket (66), a second toggle link (68) having one end pivotally connected to the bar (39) and its other end pivotally connected to the other end of the first toggle link (67), and stop means (69) connected to the bracket (66) for engagement by one (67) of the first and second toggle links (67,68).

5. The quick release seal retainer (11) of claim 4 wherein the first and second toggle links (67,68) are movable between a first position at which both of the toggle links (67,68) are free from engagement with the stop means (69) and the seal segment (13) is released from the base (12) and a second position at which said one (67) of the first and second toggle links (67,68) is in engagement with the stop means (69) and the seal segment (13) is clamped between the clamp member (31) and the base (12), said first and second toggle links (67,68) passing through a straight line condition in response to being moved between the first and second positions.

6. The quick release seal retainer (11) of claim 5 including means (81) for pivoting the first and second toggle links (67,68) between the first and second positions, said means (81) including a hole (82) in the first link (69), and a tool (83) having a tang (84) adapted to slidably fit within the hole (82).

7. The quick release seal retainer (11) of claim 6 wherein said tool (83) has a head (86), and a handle (87) rotatably connected to the head (86), said tang (84) extending outwardly from said head (86).

8. The quick release seal retainer (10) of claim 1 wherein said locking and moving means (44) includes a cam clamp mechanism (51) connected to the mounting block (12) and having a member (54) adapted for engagement with the bar (39) of the connecting means (36).

9. A seal assembly (91) adapted for sealing against the end of an annular workpiece (19) and for sealingly embracing a member (21) extending axially from the axial end of the workpiece (19) comprising;
    an inner annular seal (92) having an outer periphery (96) and a plurality of alternate cutouts (93) and projections (94) at the outer periphery (96), the cutouts (93) being of a size sufficient for intimately receiving an inner portion of the axially extending members (92) with the projections (94) extending radially between the members (21) and terminating at the median of the members (21); and
    an outer annular seal (97) made up of a plurality of seal segments (13) arranged in end to end relation, each of said segments (13) having a cutout (98) positioned between opposite end portions (99), the cutout (98) being of a size sufficient for intimately receiving the outer portion of the axially extending member (21) with the opposite end portions (99) being in sealing engagement with the projections (94) of the inner annular seal (92).

* * * * *